April 7, 1970  E. A. WUNSCH  3,504,560
VARIABLE SPEED PULLEY
Filed April 25, 1968  2 Sheets-Sheet 1

INVENTOR.
Erich A. Wunsch
BY Hill, Sherman, Meroni, Gross & Simpson
ATTORNEYS

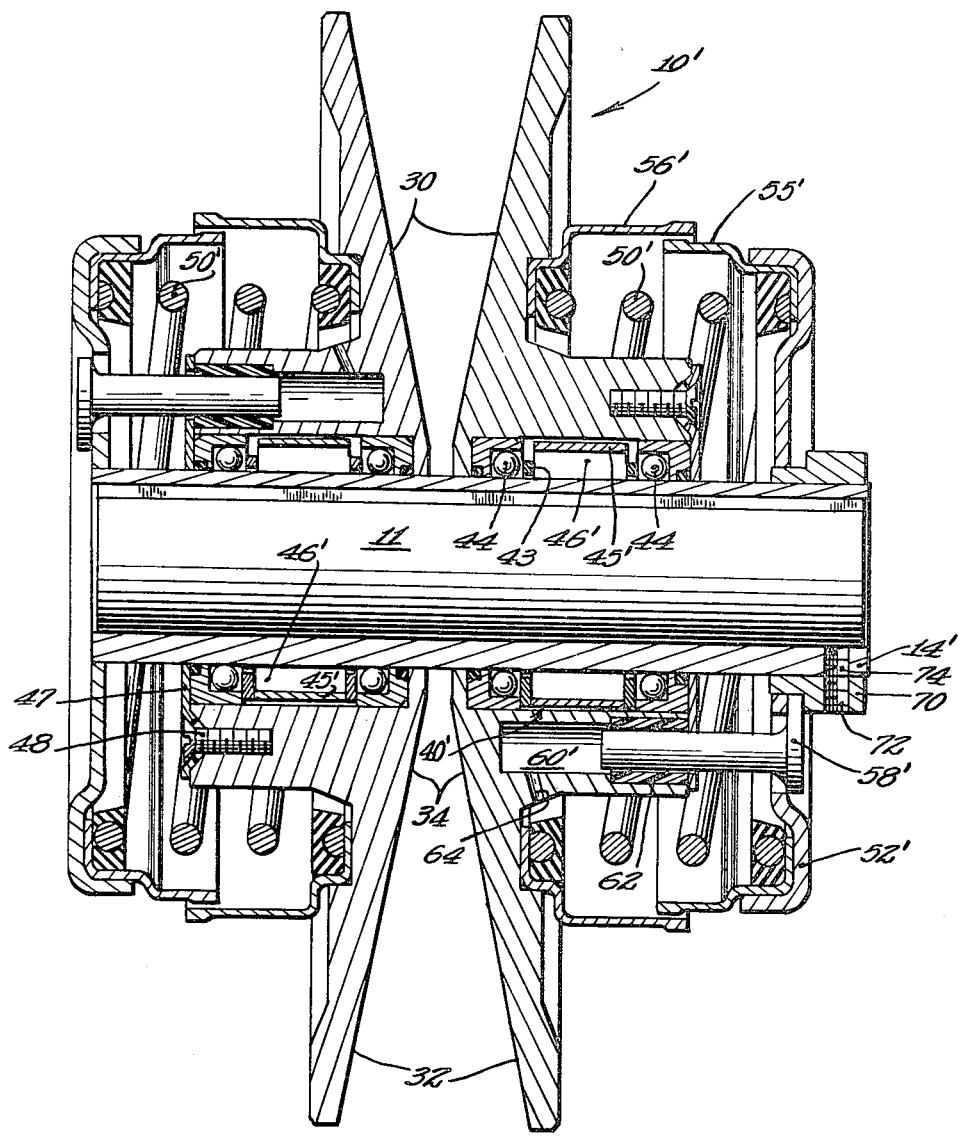

United States Patent Office 3,504,560
Patented Apr. 7, 1970

3,504,560
VARIABLE SPEED PULLEY
Erich Anton Wunsch, Stuttgart, Germany, assignor to Gerbing Manufacturing Company, Elgin, Ill., a corporation of Illinois
Filed Apr. 25, 1968, Ser. No. 724,099
Int. Cl. F16h 55/52
U.S. Cl. 74—230.17          8 Claims

ABSTRACT OF THE DISCLOSURE

A V-type variable pitch pulley comprising a pair of relatively movable pulley halves mounted on a sleeve, one of the halves being supported by bearing means having lubricant packed therein, means to bias the pulley halves together, a series of pins connected at one end to the sleeve, and circumferentially arranged pin bearings mounted on the movable pulley half with the pins being movable axially of the pin bearings as the distance between the pulley halves is varied and as the movable pulley half slides on its bearings.

BACKGROUND OF THE INVENTION

This invention relates to variable speed pulleys and pertains more particularly to a V-shaped pulley which can be used both as a pulley and a clutch.

It is known to have V-type variable pitch motor pulleys incorporating a member constituting one pulley half fixed on a shaft of a driving or driven assembly and the other pulley half spring-loaded in the direction of the fixed pulley half. Similarly, it is known to have a pair of pulley halves having inclined flanges facing one another being relatively movable axially with each half under the influence of a coil spring.

Such pulleys have been adversely affected by problems caused by drive belt width variations, dirt, lubrication and fretting corrosion.

SUMMARY OF THE INVENTION

In accordance with the present invention, I have provided a variable speed pulley having pulley halves with inclined facing flanges mounted on a sleeve, sealed ball bearings to support the pulley halves in relative axial movement, pins generally parallel to the axis of rotation to secure the relatively movable pulley half against rotatable movement, and non-metallic bearings for the pins.

Accordingly, it is an object of the present invention to provide a variable speed pulley which incorporates ball bearings to support relatively moveable pulley halves.

A further object of the present invention is to provide a variable speed pulley which positively fixes the pulley halves against relative rotation by means of axially aligned pins in non-metallic bearings.

Still a further object of the present invention is to provide a variable speed pulley which permits high speed rotation and repeated reversal without the difficulties inherent in relatively movable pulley halves.

Yet a further object of the present invention is to provide a variable speed pulley in which the pulley halves are relatively axially movable on ball bearings that are permanently lubricated.

Yet another object of the present invention is to provide a variable speed pulley of improved design to reduce wear and increase service life and reliability.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

FIG. 3 is an axial sectional view of a modified variable speed pulley made in accordance with the principles of the present invention.

Figures 1, 2:
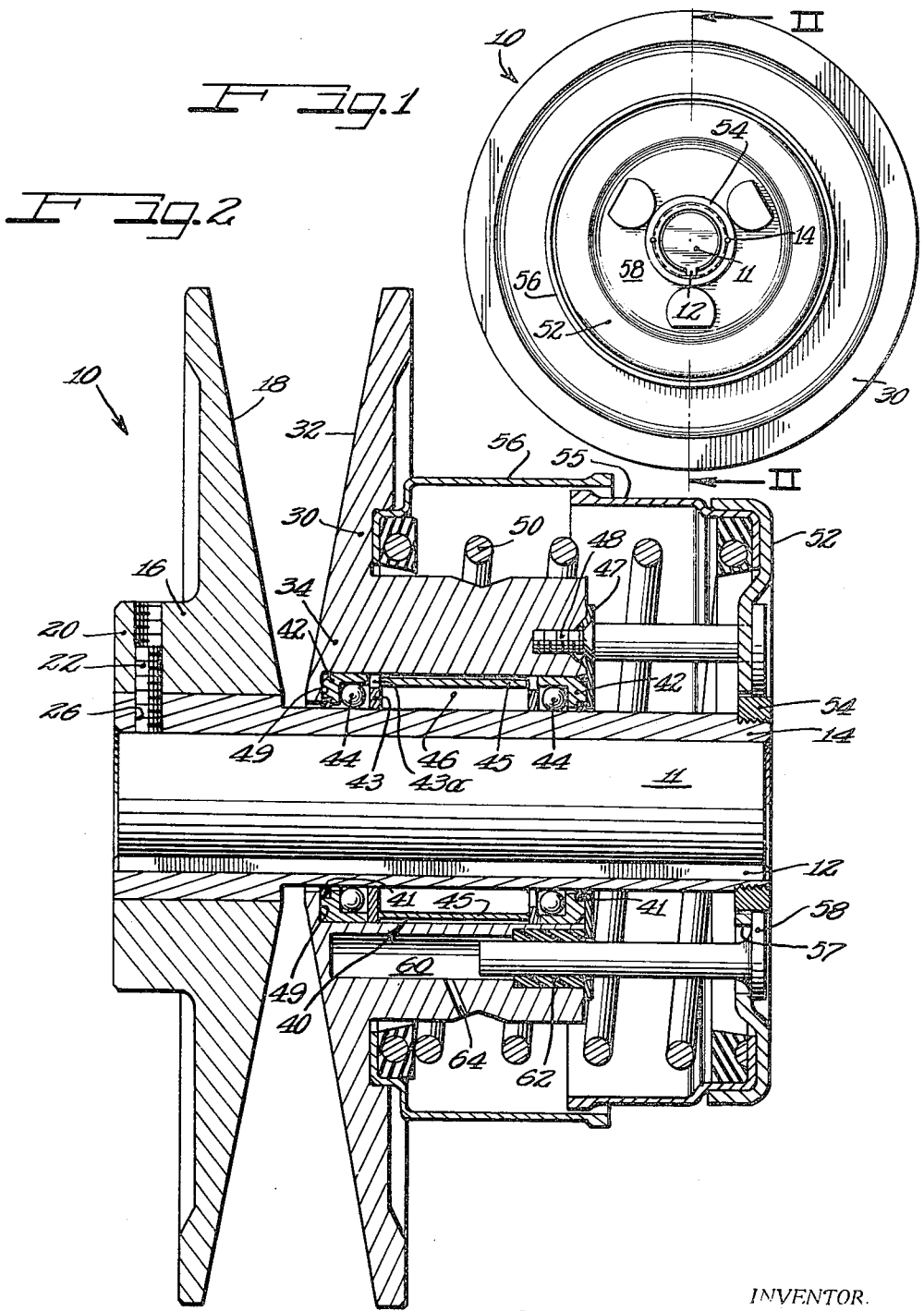
FIG. 1 is an end view of a variable speed pulley made in accordance with the invention.
FIG. 2 is an enlarged axial sectional view of the variable speed pulley of FIG. 1 taken along the line II—II of FIG. 1.

The principles of this invention are particularly useful when embodied in a variable speed pulley as illustrated in FIGS. 1 and 2, generally indicated by the numeral 10.

The variable speed pulley 10 is formed about a shaft 11 having a keyway 12. The shaft 11 is engaged by an inner sleeve 14 which is rotatable with the shaft 11. Fixedly mounted on the inner sleeve 14 is a pulley half 16 having an inclined flange 18 and a hub 20. The hub 20 has a radial set screw 22 adapted to engage a threaded aperture 26 in the inner sleeve 14.

Slidably mounted on the inner sleeve 14 is a second pulley half 30 having an inclined flange 32 facing the inclined flange 18 to form a V-type pulley.

The slidable pulley half 30 has a hub 34 having a recess to receive a bearing and lubricating housing 40 about the inner sleeve 14. The bearing housing 40 has a pair of O-ring seals 41 secured by a pair of angular radial rings 42. The radial rings 42 with a pair of retainer rings 43 overlie sets of ball bearings 44. The sets of ball bearings 44 are annularly engaged with the sleeve 14, and are separated by a spacer ring 45. The ball retainer rings 43 and the spacer rings 45 form an oil reservoir 46 about the sleeve 14. The oil reservoir or chamber 46 is packed with lubricant.

The ball retainer rings 43 are formed with notches 43a to permit lubricant to flow in the sealed chamber 46. The ball retainer rings 43 are cooperable with the radial rings 42 to define ball cavities having an axial dimension in excess of the diameters of the associated ball bearings for permitting controlled axial movement of the ball bearings in the ball cavities on the sleeve 14.

The bearing and lubricating housing 40 is secured within the hub 34 of the axially movable pulley half 30 by means of a bearing retainer ring 47 attached to the hub 34 by means of a plurality of set screws 48. One of the pair of angular radial rings 42 abuts the retainer ring 47 and the other angular radial ring 42 abuts an inner wall 49 within the hub 34.

The axially slidable pulley half 30 is urged by a coil spring 50 towards the fixed pulley half 16. The coil spring 50 abuts against a radial flange 52 which is fixedly mounted on the inner sleeve 14 by a threaded connecting member 54. The spring 50 is enclosed by a pair of concentric overlapping housing members 55, 56. The inner housing member 55 is fixedly mounted to the radial flange 52. The outer housing member 56 is secured to the axial slideable pulley half 30. As the axially slidable pulley half 30 moves to the right, FIG. 2, the outer housing 56 overlaps the inner housing 55.

The radial flange 52 has formed therein a plurality of apertures 57 which receive a plurality of axially aligned pins 58 that connect with a set of corresponding apertures 60 formed in the hub 34 of the axially movable pulley 30. The pins 58 are disposed parallel to the shaft 11.

The pin 58 is slidably received in the aperture 60 in the hub 34 of the slidable pulley 30. At the mouth of the aperture 60 is a synthetic sleeve bearing 62 each of which supports one of the pins 58. The bearing 62 may be formed of polyurethane plastic. An air relief orifice 64 is formed connecting the apertures 60 with the exterior of the hub 34 which is covered by the housing members 54, 56.

The axially movable pulley half 30 is fixed by the pins 58 through the non-metallic sleeve bearings 62 to prevent rotatable movement with respect to the shaft 11 and the fixed pulley half 16. This results in reduced wear of the components in the pulley structure.

Inherent in the manufacturing processes of V-belts are variations in width desired. These variations cause minute axial displacements of the pulleys while the belts are running. The pulley 10 is designed so that the minute axial movements caused by the belt are taken up by the sets of ball bearings 44, which prevent fretting corrosion.

When the position of the pulley 10 is altered to effect a speed change, sliding friction does occur, but does not result in wear, due to the races of the ball bearings 44 as well as the shaft of the pulley 14, being hardened and ground. The sets of ball bearings are positively sealed on both sides by the O-rings 41 to prevent the ingress of dirt and other foreign matter.

From the foregoing description, the operation of the pulley 10 can be readily understood. The pulley 10 is designated to be used in a system with a V-belt (not shown) connecting to a second pulley of a similar type or of a fixed type. Assuming that the belt is connected to to a rather heavy load and it is desired to start a motor (not shown) driving the shaft 11, FIG. 2, then the inertia on the belt will cause the pulley halves 18, 30 to separate to allow rotation of the variable speed pulley 10 in a relatively unloaded condition. The sets of ball bearings 44 and the spacer ring 45 facilitate such axial movement of the axially movable pulley half 30. Thus the variable speed pulley 10 will automatically compensate for loading on a V-belt being driven by the variable speed pulley 10. There will be produced an idling of the variable speed pulley 10, corresponding to the functioning of a clutch.

As the load is brought up to speed, the coil spring 50 causes the pulley half 30 to move to the left toward the axially fixed pulley half 16, FIG. 2. The V-belt will seek its own natural radial distance in the groove formed between the inclined faces 18, 32 for the particular load then encountered. The pulley halves 16, 30 will be in abutting relationship in an unloaded condition, FIG. 2.

As the load on the V-belt increases for any reason, the V-belt will cam itself inwardly towards the center of the pulley 10 with a concomitant decrease in the pulley's moment arm which is, of course, governed or opposed by the force exerted by the spring 50. In this way there is alawys automatically maintained a diameter such that the reduced pulley ratio is inversely proportional to the load. During any radial shifting of the V-belt, it will be recognized that there is axial movement of the movable pulley half 30 with respect to the inner sleeve 14. This axial movement is facilitated by the sets of ball bearings 44 and the spacer ring 45 and is restricted to the longitudinal or axial movement. The pins 58 secured by the bearings 62 which lie in the axial direction preclude any movement of the movable pulley 30 radially about the inner sleeve 14.

Should the load increase beyond the limit set by the capacity of the motor driving the shaft 11 or the strength of the driven apparatus, the V-belt will completely separate the pulley halves 16, 30 and will ride on the inner sleeve 14. This constitutes an over-ride feature which prevents a blockage in the driven system from traveling back in the system to damage the pulley or the motor. This also prevents the motor from stalling. An example of such operation would be in the drive train of a power lawn mower.

During the cycle of operation set forth in the preceding description, it will be recognized that the V-belt is continually shifting radially, unless the load is constant, although such shifting may not be of such magnitude as to be perceptible in all cases. The radial movement of the V-belt, of course, imparts longitudinal or axial movement to the movable pulley half 30. The sets of ball bearings 44 and the spacer ring 45 which are interposed between the inner sleeve 14 and the hub 34 of the movable pulley half 30 provide anti-friction means for permitting such axial movement of the hub 34. In this manner, the pulley half 30 may be displaced with respect to the pulley half 16 without interference and accordingly the pulley 10 will adjust itself even for the most minute changes in load conditions. Excessive loads will as noted cause the V-belt to ride directly on the inner sleeve 14. An idler pulley (not shown) may be provided in such a system to take up slack in the V-belt and in the intermediate positions assumed by the V-belt.

A modification of the V-type variable speed pulley incorporating a pair of axially movable pulley halves is shown in FIG. 3. Structural members are numbered corresponding to FIG. 2 with modified members primed. In this embodiment, the movable pulley halves 30 are each secured against relative rotative movement with respect to the shaft 11 by means of the radial flanges 52 fixed at either end of the inner sleeve 14'. The radial flange 52 is fixedly mounted on a shaft engaging hub portion 70 having a threaded keyway 72 therein adapted to engage with a threaded aperture 74 in the inner sleeve 14'.

Operation of this embodiment corresponds with that of FIG. 2. At the start up, the V-belt causes separation of the movable pulley halves 30. As the shaft 11 is brought up to speed the springs 50' cause the movable pulley halves 30 to come together. The springs 50' bear against the radial flange 52 and the inner portion of the movable pulleys 30. If the load should increase for any reason, then the V-belt will cam itself inwardly toward the center of the pulley and thereby decrease the pulley's moment arm opposed by the force on the pulley halves 30 of the springs 50'. Radial shifting of the V-belt will cause axial movement of the pulley halves 30. This movement is facilitated by the bearing members comprising the sets of ball bearings 44 and the spacer rings 45' to maintain the proper pulley diameter at all times. Should the load increase beyond the set limit, usually determined by the capacity of the motor driving the shaft 11 or the strength of the driven apparatus, the belt will completely separate the pulley halves 30 and will ride on the inner sleeve 14'.

With the construction of the two movable pulley halves 30 mounted on a common shaft 11, it will be appreciated that the pulley halves 30 are independently biased towards each other by independent coil springs 50' interposed between the pulley halves 30 and the radial flanges 52. Accordingly, the movable pulley halves 30 shift automatically into position to align themselves properly with the V-belt as movement of the belt is caused by other driven or driving elements in the system.

Each of the pulley halves 30 are symmetrical about the axis of rotation and are designed to minimize the mass thereof. Accordingly, high speed rotation of either embodiment of the V-type variable speed pulley, FIG. 2 or 3, does not result in dynamic imbalance, and results in the pulley system operating freely and without undesirable vibration. Moreover, the pulley halves are designed so that a minimum mass is in rotation so that the inertia is minimized. This object is attained in part by concentrating the mass of the pulley halves in the hub portion 20, 34. The work required to reverse rotation of the pulley system is thereby reduced. In practice the system may be employed in operation where both high speed rotation and repeated rapid reversals of the direction of rotation are required.

Although minor modifications might be suggested by those versed in the art, it should be understood that I wish to embody within the scope of the patent warranted hereon all such embodiments as reasonably and properly come within the scope of my contribution to the art.

The embodiments of the invention in which an exclusive property or privilege is claimed are defined as follows:

1. A variable pitch pulley comprising a sleeve; first and second relatively movable pulley halves mounted on said sleeve; bearing means for supporting said pulley halves on said sleeve; means to bias said pulley halves together; means for securing said pulley halves against rotation with respect to said sleeve, said means for securing said second half against rotation with respect to said sleeve including a plurality of pins fixed in relation to said sleeve and in sliding fit relationship with a corresponding plurality of apertures in said second movable pulley half, a housing means in overlapping, sliding fit relationship about said pins comprising a first concentric member secured against said second pulley half and a second concentric member is secured against said sleeve; said means for securing said pulley halves including a retainer ring; a coil spring having a first end bearing against said first housing member which in turn bears against said second pulley half and said second end bearing against said second concentric housing member which in turn bears against said retainer ring.

2. A pulley according to claim 1 wherein said first concentric member has a ridge protruding into a groove in said second pulley half.

3. A pulley according to claim 2 wherein said ridge in said concentric member on the side abutting the pulley half forms a corresponding groove on the opposite side thereof and said first end of said coil spring is received in said groove of said concentric member.

4. A pulley according to claim 3 wherein said pin means are positioned generally on a circle concentric with said sleeve and wherein said coiled spring is of a diameter greater than said pin circle.

5. A pulley according to claim 3 wherein said movable pulley bearing means includes a pair of ball bearing rings separated by a spacer ring.

6. A variable pitch motor pulley including: a sleeve; a pair of pulley halves movably mounted on said sleeve; bearing means to support said pulley halves on said sleeve; a retainer means radially rotating with said sleeve; means connecting said radially rotating retainer means with said pulley halves to limit the motion of said pulley halves to axial movement; and means biasing said pulley means together; a pair of housing means in overlapping sliding fit relationship each comprising a first concentric member secured to one of said second pulley halves and a second concentric member secured to said sleeve, said means for securing said pulley halves including a retainer ring, a coiled spring having a first end bearing against said first housing member which in turn bears against said pulley half and a second end bearing against said concentric member which in turn bears against said retainer ring.

7. A motor pulley according to claim 6 wherein said first concentric member has a ridge protruding into a groove in its respective pulley half.

8. A motor pulley according to claim 7 wherein said ridge in said concentric member on the side abutting the pulley half forms a corresponding groove on the opposite side thereof and said first end of said coiled spring is received in said groove of said concentric member.

References Cited

UNITED STATES PATENTS

| | | | |
|---|---|---|---|
| 2,952,161 | 9/1960 | Williams | 74—230.17 |
| 3,142,997 | 8/1964 | Rampe | 74—230.17 |
| 3,400,600 | 9/1968 | Ruprecht et al. | 74—230.17 |

FOREIGN PATENTS 785,130   10/1957   Great Britain.

JAMES A. WONG, Primary Examiner